United States Patent
Takahashi et al.

(10) Patent No.: US 8,160,294 B2
(45) Date of Patent: Apr. 17, 2012

(54) ELECTRONIC WATERMARK EMBEDMENT APPARATUS AND ELECTRONIC WATERMARK DETECTION APPARATUS

(75) Inventors: Jun Takahashi, Kawasaki (JP); Kensuke Kuraki, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1020 days.

(21) Appl. No.: 11/862,592

(22) Filed: Sep. 27, 2007

(65) Prior Publication Data

US 2008/0080738 A1  Apr. 3, 2008

(30) Foreign Application Priority Data

Sep. 28, 2006  (JP) ................................. 2006-266015

(51) Int. Cl.
  *G06K 9/00*  (2006.01)
(52) U.S. Cl. ...................................... 382/100
(58) Field of Classification Search .................. 382/100, 382/181, 190, 195; 713/168, 170, 176, 179, 713/180; 358/3.28–3.3; 380/258
  See application file for complete search history.

(56) References Cited

U.S. PATENT DOCUMENTS

| | | | |
|---|---|---|---|
| 6,526,155 B1* | 2/2003 | Wang et al. | 382/100 |
| 6,580,804 B1 | 6/2003 | Abe | |
| 6,768,558 B1* | 7/2004 | Yamashita et al. | 358/1.18 |
| 6,983,056 B1* | 1/2006 | Amano | 382/100 |
| 7,006,257 B1* | 2/2006 | Yamazaki et al. | 358/3.28 |
| 7,411,702 B2* | 8/2008 | Eguchi et al. | 358/3.28 |
| 7,532,738 B2* | 5/2009 | Hashimoto et al. | 382/100 |
| 7,769,200 B2* | 8/2010 | Hamatake et al. | 382/100 |
| 7,796,778 B2* | 9/2010 | Hsieh et al. | 382/100 |
| 2001/0017709 A1* | 8/2001 | Murakami et al. | 358/1.14 |
| 2002/0002679 A1* | 1/2002 | Murakami et al. | 713/176 |
| 2002/0090111 A1* | 7/2002 | Fukushima et al. | 382/100 |
| 2002/0105839 A1 | 8/2002 | Sugahara | |
| 2003/0128863 A1 | 7/2003 | Hayashi | |
| 2003/0149936 A1 | 8/2003 | Tamaru | |
| 2004/0101160 A1* | 5/2004 | Kunisa | 382/100 |
| 2005/0063562 A1* | 3/2005 | Brunk et al. | 382/100 |
| 2005/0154892 A1* | 7/2005 | Mihcak et al. | 713/176 |
| 2005/0190948 A1* | 9/2005 | Isogai | 382/100 |
| 2005/0207615 A1* | 9/2005 | Stach | 382/100 |
| 2005/0286088 A1* | 12/2005 | Takagi | 358/3.28 |
| 2006/0210193 A1 | 9/2006 | Ishii | |
| 2007/0201719 A1* | 8/2007 | Hashimoto et al. | 382/100 |

FOREIGN PATENT DOCUMENTS

CN         1635533 A         7/2005

(Continued)

OTHER PUBLICATIONS

Japanese Office Action issued Aug. 30, 2011 in corresponding Japanese Patent Application 2006-266015.

(Continued)

*Primary Examiner* — Jason M Repko
*Assistant Examiner* — Shervin Nakhjavan
(74) *Attorney, Agent, or Firm* — Staas & Halsey LLP

(57) ABSTRACT

A figure pattern expressing information to be embedded, or a position of an area in which the information to be embedded exists, is embedded in an area other than the background of image data, thereby generating image data embedded with a watermark. Then, the figure pattern is detected from the generated image data embedded with the watermark, and embedded information expressed by the detected figure pattern or embedded information existing in an area at a position expressed by the detected figure pattern is detected.

13 Claims, 29 Drawing Sheets

FOREIGN PATENT DOCUMENTS

| | | |
|---|---|---|
| CN | 171061 A | 12/2005 |
| CN | 1710610 A | 12/2005 |
| EP | 1 136 946 | 9/2001 |
| EP | 1 684 496 | 7/2006 |
| JP | 2000-59610 | 2/2000 |
| JP | 2002-276842 | 10/2000 |
| JP | 2001-251490 | 9/2001 |
| JP | 2001-346032 | 12/2001 |
| JP | 2003-101762 | 4/2003 |
| JP | 2004-289783 | 10/2004 |
| JP | 3628312 | 12/2004 |
| JP | 2005-236756 | 9/2005 |
| JP | 2006-074166 | 3/2006 |
| JP | 2006-108994 | 4/2006 |
| JP | 2006 166282 | 6/2006 |
| JP | 2001-78006 | 3/2007 |

OTHER PUBLICATIONS

J. Brassil, et al., "Electronic Marking and Identification Techniques to Discourage Document Copying," Proc. IEEE INFOCOM '94, vol. 3.

Y. Nakumura, et al., "Embedding Signature into Japanese Printed Documents for Copyright Protection," Journal of the 50-th (First Term of 1995) National Conference of Information Processing Society of Japan, vol. 3.

E. Yodogawa, et al., "Recognition Science of Vision and Hearing," IEICE, Corona Publishing Co., Ltd. pp. 16-21.

Chinese Office Action issued on May 8, 2009 in corresponding Chinese Patent Application 2007101617009.

Chinese Office Action issued Nov. 26, 2010 in corresponding Chinese Patent Application 200710161700.0.

Japanese Office Action issued Apr. 5, 2011 in corresponding Japanese Patent Application 2006-266015.

Korea Office Action issued Mar. 26, 2009 in corresponding Korean Patent Application 10-2007-98446.

Search Report issued in corresponding European Patent Application No. 07 01 8936, mailed Nov. 21, 2007.

Chinese Office Action issued Apr. 26, 2010 in corresponding Chinese Patent Application 200710161700.9.

\* cited by examiner

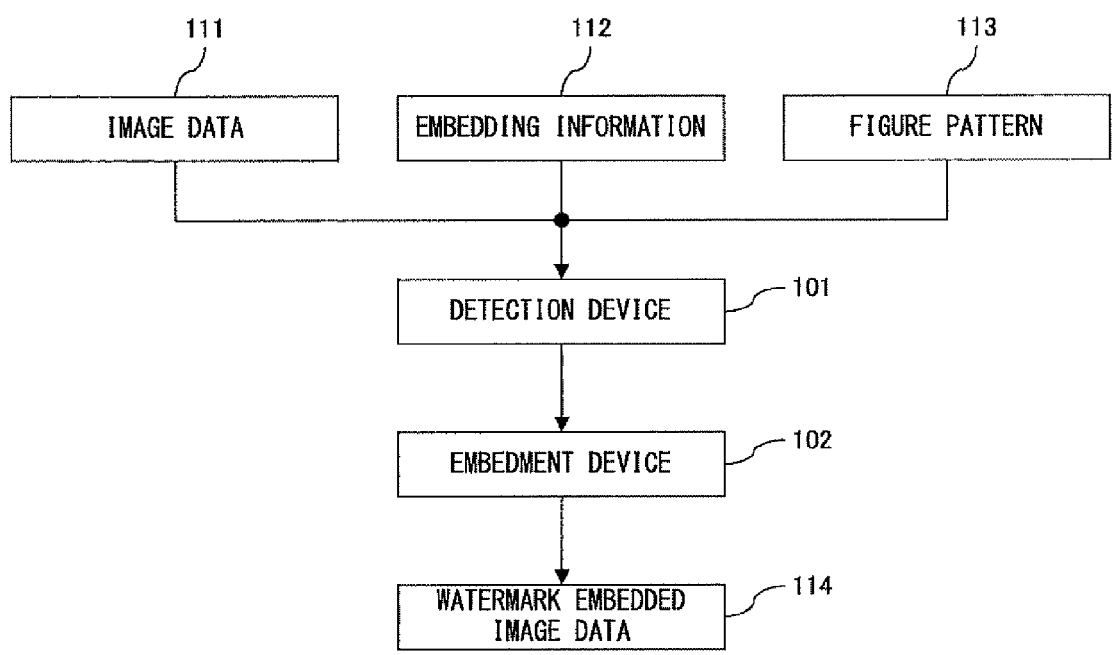
F I G. 1

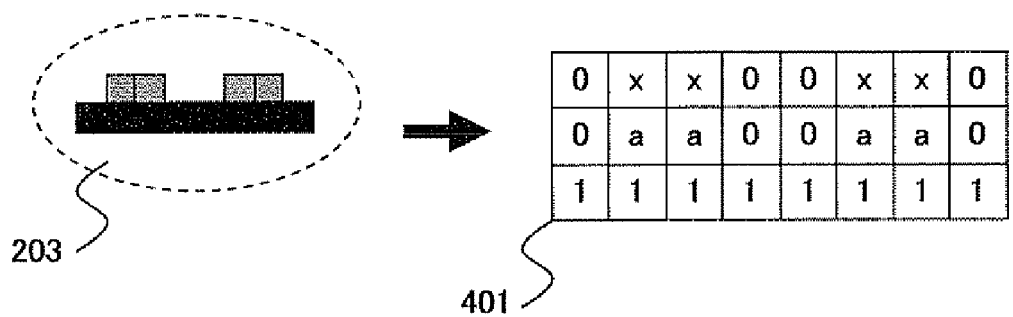
F I G. 4

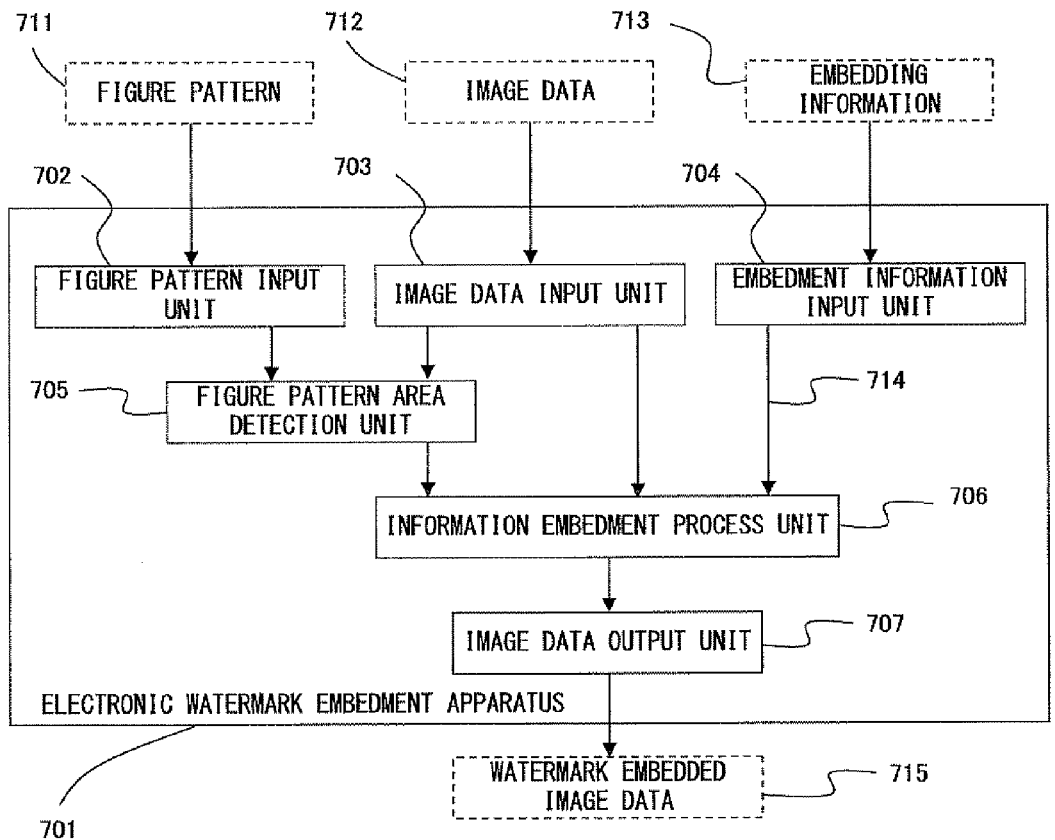
F I G. 7

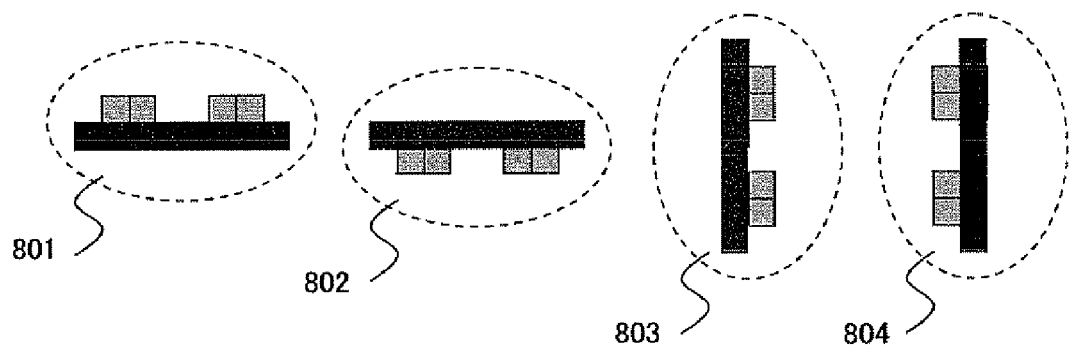
F I G. 8

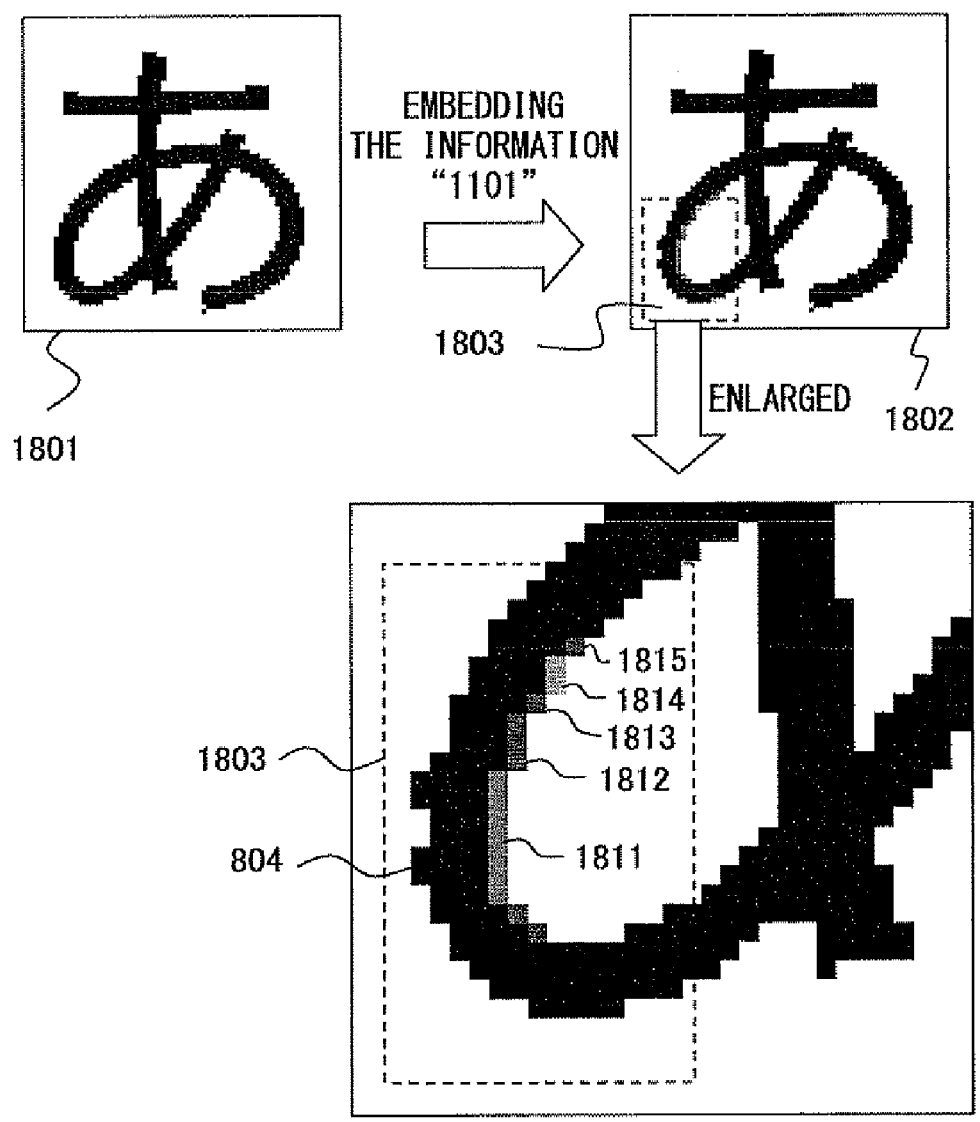
F I G. 18

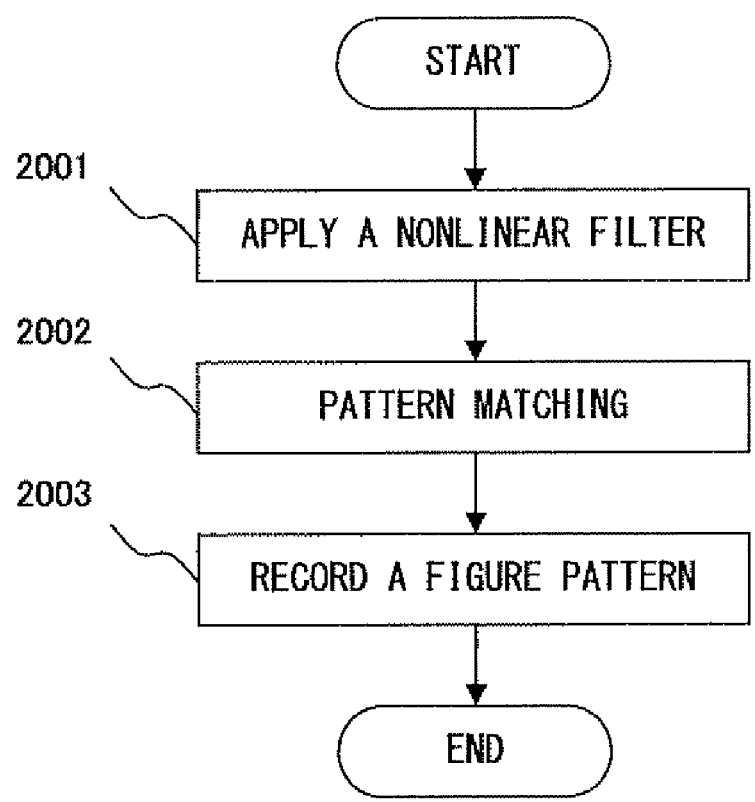
F I G. 2 0

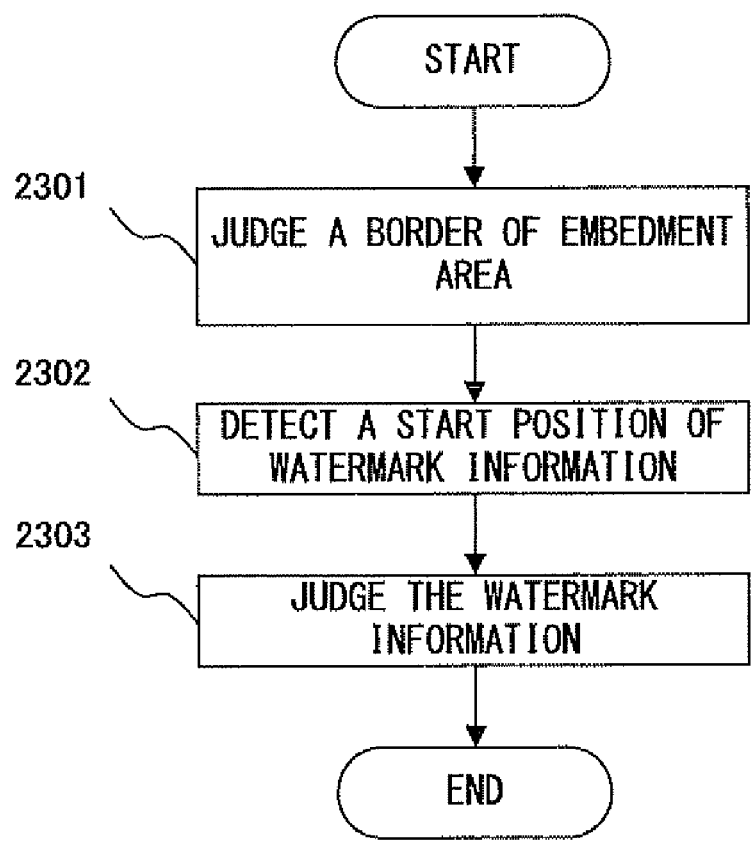
F I G. 2 3

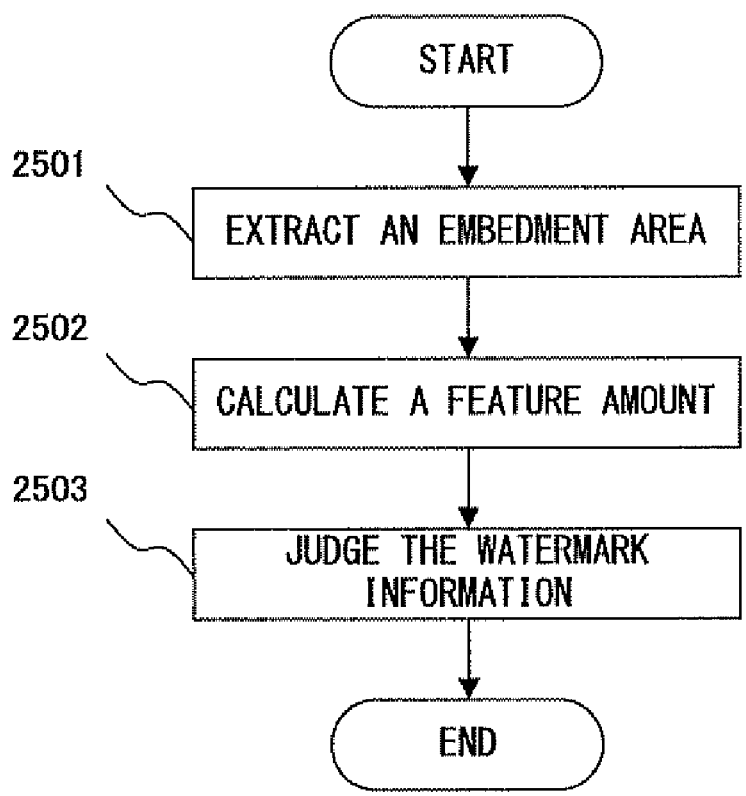
F I G. 2 5

| 2701 | i−1 | i | i+1 |
|---|---|---|---|
| j−1 | 1 | 0 | −1 |
| j | 2 | 0 | −2 |
| j+1 | 1 | 0 | −1 |

| 2702 | i−1 | i | i+1 |
|---|---|---|---|
| j−1 | 1 | 2 | 1 |
| j | 0 | 0 | 0 |
| j+1 | −1 | −2 | −1 |

FIG. 27

ELECTRONIC WATERMARK EMBEDMENT APPARATUS AND ELECTRONIC WATERMARK DETECTION APPARATUS

BACKGROUND OF THE INVENTION

1. Field of the Invention

The present invention relates to an electronic watermark embedment apparatus embedding information in image data in a humanly imperceptible form and generating the image data embedded with a watermark for printing, and to an electronic watermark detection apparatus detecting embedded information on the basis of a scanned image obtained from printed matter containing image data embedded with a watermark.

2. Description of the Related Art

An electronic watermark is a technique for embedding the tracking information, such as copyright information and the person who performed the printing, in electronic data such as image and voice. An electronic watermarking technique is for detecting information embedded as a "watermark" from electronic data, thereby making it possible to confirm an "unauthorized duplication" of a literary work and track leakage of "internal use only" information. Particularly for an electronic medium that allows printing, such as a document image, it is necessary to have the capability of detecting watermark information not only from electronic data but also from a printed paper medium.

Known watermark techniques include a method (e.g., refer to non-patent document 1 listed below) for embedding information by changing the character interval of an English character string, and a method (e.g., refer to non-patent document 2 listed below) for embedding information by enlarging, reducing or rotating a character.

Also, as a method for embedding information in the background of a document, a method is disclosed (e.g., refer to patent documents 1 and 2 listed below) for embedding a dot pattern in the background of a document image. By embedding a dot pattern in the background of a document image, it is possible to detect information stably even if a printed document is somewhat dirty.

Furthermore, as a method for embedding information elsewhere other than the background of a printed document, the disclosed method includes a method (e.g., refer to patent document 3 listed below) for providing a judgment criteria and a priority order for an alteration on the basis of the human sense of sight related to a binary image and applying an alteration starting from a pixel with a high priority and proceeding in order of priority, thereby inserting watermark information; and a technique (e.g., refer to patent document 4 listed below) of extracting a feature point from a character in a document image, thereby embedding an electronic watermark in the feature point.

Patent document 5 listed below relates to a method for embedding watermark information in a black & white binary document image, while patent document 6 listed below relates to a data embedding method for identifying an embedded position by converting a binary image to a multiple value image. Meanwhile, non-patent document 3 shows that the human sense of sight has a tendency to perceive a proximity area, a closed area and a continuous area as a single unified area.

Patent document 1: Registered Japanese patent No. 3628312
Patent document 2: Laid-Open Japanese Patent Application Publication No. 2001-346032
Patent document 3: Laid-Open Japanese Patent Application Publication No. 2004-289783
Patent document 4: Laid-Open Japanese Patent Application Publication No. 2006-074166
Patent document 5: Laid-Open Japanese Patent Application Publication No. 2001-078006
Patent document 6: Laid-Open Japanese Patent Application Publication No. 2006-108994
Non-Patent document 1: J. T. Brassil, S. Low, N. F. Maxemchuk, and L. O'Gorman, "Electronic marking and identification techniques to discourage document copying", Proc. IEEE INFOCOM '94, vol. 3, pp. 1278-1287, 1994
Non-Patent document 2: Yasuhiro Nakamura and Kineo Matsui (co-authors), "Embedding signature information into Japanese printed documents for copyright protection", the 50th Annual Conference of the Information Processing Society of Japan; vol. 3, pp. 203 to 204, 1994
Non-Patent document 3: Eiji Yodogawa, Yoichi Higashikura and Kazunari Nakane (co-authors), "Recognition science on the senses of sight and hearing", pp. 18 through 21; edited by the Institute of Electronics, Information and Communication Engineers (Japan); Corona Publishing Co. Ltd.; 1998

The conventional methods for embedding an electronic watermark noted above are faced with the following problems.

The embedment method as noted in non-patent documents 1 and 2, being capable of embedding only in the characters within a document, are faced with the problem that the amount of information to be embedded largely depends on the number of characters.

The embedment method as noted in patent documents 1 and 2 is faced with the problem that information that has been embedded can easily be recognized because the dot pattern embedded in the background is rather conspicuous.

The embedment methods as noted in patent documents 3 and 4 embed information especially in the contours and gaps of figures and characters, and therefore are faced with the problem that there is a risk of losing the embedded information when the material is printed or copied a few times and the image becomes blurry in, for example, the contours.

SUMMARY OF THE INVENTION

The problem for the present invention is to provide the capability of embedding information in image data so that the embedded information is hardly visually discernible and also so that the embedded information remains detectable even when processes such as copying and cutoff are applied after the printing, and to provide the capability of detecting the embedded information from the printed matter stably.

An electronic watermark embedment apparatus according to the present embodiment comprises a detection device and an embedment device, and embeds information in image data.

The detection device detects a figure pattern area allowing an embedment of a figure pattern, the figure pattern, which is composed by a specific pattern, expressing information to be embedded or a position of an area in which the information to be embedded exists, from an area other than the background within the image data. The embedment device generates image data embedded with a watermark by embedding the figure pattern in the detected figure pattern area.

An electronic watermark detection apparatus according to the present invention comprises a figure pattern detection device and an information detection device, and detects information embedded in image data embedded with a watermark.

The figure pattern detection device detects a figure pattern from an area other than a background area within the image data embedded with the watermark. The information detection device detects embedded information expressed by a detected figure pattern or embedded information existing in an area in a position expressed by a detected figure pattern.

BRIEF DESCRIPTION OF THE DRAWINGS

FIG. 1 shows the principle of an electronic watermark embedment apparatus according to the present invention;

FIG. 4 is a diagram showing a first method for storing a figure pattern;

FIG. 7 is a configuration diagram of an electronic watermark embedment apparatus;

FIG. 8 is a diagram showing four kinds of figure patterns;

FIG. 18 is a diagram showing an information embedment process;

FIG. 20 is a flow chart of a figure pattern detection process;

FIG. 23 is a flow chart of a first information detection process;

FIG. 25 is a flow chart of a first information detection process;

FIG. 27 is a diagram showing a Sobel filter;

DESCRIPTION OF THE PREFERRED EMBODIMENTS

Figure 2:
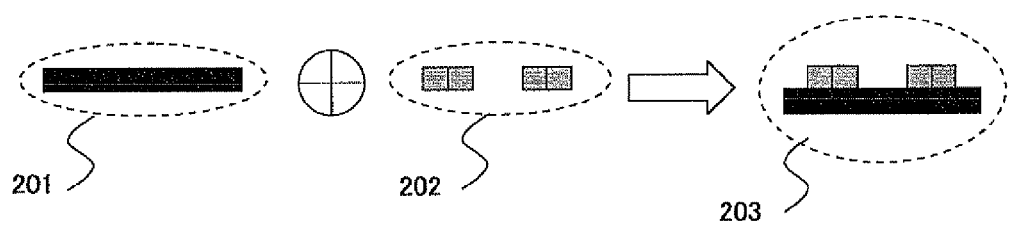
FIG. 2 is a diagram showing a figure pattern.

The following is a detailed description of the preferred embodiment of the present invention by referring to the accompanying drawings.

FIG. 1 shows the principle of an electronic watermark embedment apparatus according to the present invention. The electronic watermark embedment apparatus shown in FIG. 1 comprises a detection device 101 and an embedment device 102, and embeds information in image data 111.

The detection device 101 detects a figure pattern area allowing the embedment of a figure pattern 113 from an area other than the background within the image data 111. The figure pattern 113 expresses information to be embedded (simply noted as "embedding information" hereinafter) 112 or the position of an area in which the embedding information 112 exists. The embedment device 102 generates image data embedded with a watermark (also noted as "watermark embedded image data" hereinafter) 114 by embedding the figure pattern 113 in the detected figure pattern area.

The detection device 101 detects a figure pattern area corresponding to the shape of the figure pattern 113 in an area in which exist characters, figures, photos, dot matrix patterns and such, that is, the area other than the background, of the image data 111, and notifies the embedment device 102 of the information of the figure pattern area. The embedment device 102 embeds a figure pattern 113 in the reported figure pattern area, thereby generating the watermark embedded image data 114 embedded with embedding information 112.

The detection device 101 and embedment device 102 correspond to, for example, a figure pattern area detection unit 705 and an information embedment process unit 706, respectively, which are described later by referring to FIG. 7.

Further, an electronic watermark detection apparatus according to the present invention comprises a figure pattern detection device and an information detection device, and detects information embedded in the watermark embedded image data.

The figure pattern detection device detects a figure pattern from an area other than the background area within the watermark embedded image data. The information detection device detects embedded information expressed by a detected figure pattern or embedded information existing in the area in the position expressed by the detected figure pattern.

The figure pattern detection device and information detection device, for example, correspond to a figure pattern detection unit 1904 and information detection process unit 1905, respectively, which are described later by referring to FIG. 19.

The present invention brings forth the following superior effects:

(1) Information is embedded in an area other than the background of image data, thereby making it possible to embed the information in a form that cannot easily be recognized by human perception;

(2) An embedment of plural kinds of figure patterns within image data makes it further difficult to read the embedded information;

(3) A figure pattern is expressed by a specific pattern, thereby making it possible to detect information stably even with the occurrence of fuzziness or blurring in printed matter due to copying or printing; and (4) An embedment of information distributed in image data makes it possible to detect information stably even with a part of the image data being cut off.

In order to embed information in a form that is not easily visually discernible, the characteristics of human visual perception need to be comprehended. As an example, human vision would tend to sense a proximity area, a closed area, and a continuous area as a single unified area, according to non-patent document 3.

The method according to patent document 3 alters the pixels of the contour and cutoff parts of figures and characters, thereby embedding the information. In this case, an altered pixel is recognized as an integrated part of the figure or character, that is, as apart of the figure or character, thereby making it possible to embed the information in a way so that it is not easily detectable by a human being.

In contrast, it would be difficult to embed information so that it could not be easily detected by a human being if pixels in a solid colored background were altered because a human being would recognize the altered pixel as an independent point, that is, as an independent part. Therefore, in order to embed information so that it is not easily detected by a human being, the information needs to be embedded in an area of image data in which characters, figures, photos, dot matrix patterns and such exist, that is, in an area other than the background. As described above, however, if copying is repeated a few times, there is a risk of losing the embedded information due to deformation or the fuzziness of contours.

Meanwhile, in order to be able to detect the information even if a process such as copying or cutoff has been carried out after printing, the information needs to be embedded in the entirety of the image data as in the case of patent documents 1 and 2. In this case, while it is desirable to embed information as a specific dot pattern for securing resistance against copying or printing, the simple embedment of a dot pattern is conspicuous and therefore easily recognized visually.

Accordingly, the electronic watermark embedment apparatus according to the present embodiment is configured to embed a specific pattern in an area other than the background (noted as "foreground" hereinafter) within image data, thereby embedding information so that it is not easily discerned visually and also so that stable detection is allowed. The specific pattern uses a figure pattern.

In particular, a figure pattern is distributedly placed within image data, and information is embedded in the figure pattern or in the vicinity of the figure pattern. A detection of the figure pattern from thusly generated watermark embedded image data results in detecting the embedded information.

Provided first is a description of a figure pattern used for embedding information. A figure pattern is a pattern embedded in the foreground of image data possessing signal characteristics such as frequency, phase, amplitude and such, which are detectable by using a filter. As an example, a pattern 203 that is a result of synthesizing a basic pattern 201 and a directional pattern 202 is used as a figure pattern.

The basic pattern 201 is used to detect an area allowing the embedment of the figure pattern 203 within image data. The pixel value of the basic pattern 201 is preferably substantially different from the pixel value of the background.

The directional pattern 202 is constituted by a pattern that is a result of changing pixel values in a prescribed cycle and is used for detecting a figure pattern 203 and discerning embedding information. The pixel value of the directional pattern 202 may be the same as, or close to, that of the basic pattern 201 provided that it is different from the pixel value of the background.

As an example, when one square constituting a directional pattern 202 is represented as one dot, a directional pattern 202 can be detected by applying a nonlinear filter with a horizontal filter range of eight dots for detecting two cycles of waves (frequency) to the figure pattern 203.

Commonly, the configuration of a figure pattern is arbitrary, provided that the directional pattern is constituted by a pattern possessing a signal characteristic such as frequency, phase, amplitude or such.

Figure 3:
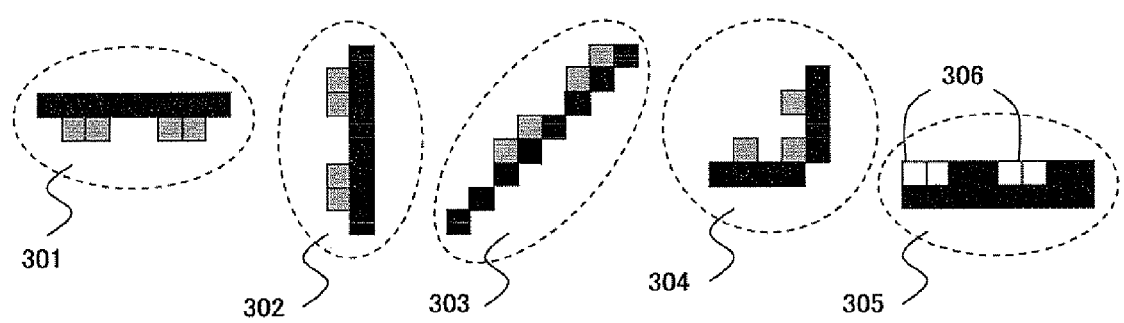
FIG. 3 is a diagram showing various figure patterns.

FIG. 3 exemplifies a configuration of a figure pattern other than the one shown in FIG. 2. Figure pattern 301 is a result of connecting the directional pattern 202 of FIG. 2 in a reverse direction to figure pattern 203; figure pattern 302 is a result of placing the basic pattern and directional pattern in the vertical direction; and figure pattern 303 is a result of placing the basic pattern and directional pattern in a diagonal direction.

Also, the basic pattern may be constituted by a form other than a direct line, as shown by figure pattern 304. Further, the figure pattern is a result of subtracting the directional pattern 306 from the basic pattern.

As such, a directional pattern indicates a prescribed direction (i.e., up, down, left, right, diagonal directions or such) in relation to the basic pattern, and a combination of different directional patterns with the single basic pattern makes it possible to express different kinds of information.

The figure pattern 203 shown in FIG. 2 is stored as a two-dimensional matrix 401 in, for example, the memory of the electronic watermark embedment apparatus, as shown in FIG. 4. The two-dimensional matrix 401 is constituted by "1" indicating a part of the basic pattern 201, by "0" indicating a part that is not a part of the basic pattern 201, by "a" indicating a part of the directional pattern 202, and by "x" indicating a part not to be used for a pattern matching (described later).

Figure 5:
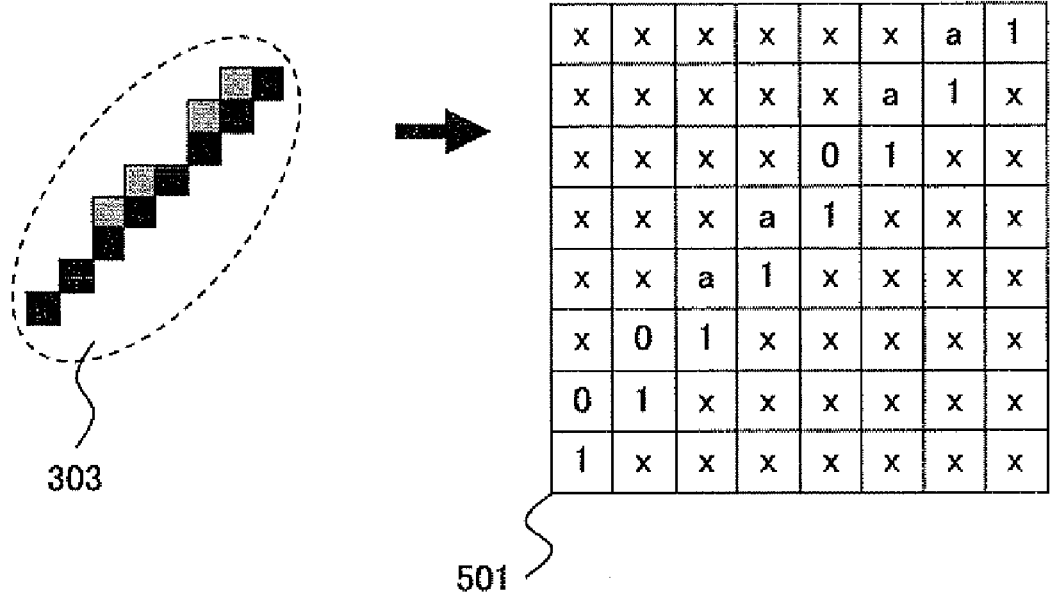
FIG. 5 is a diagram showing a second method for storing a figure pattern.

Meanwhile, FIG. 5 shows a result of expressing the figure pattern 303 of FIG. 3 in a two-dimensional matrix. In the two-dimensional matrix 501, it is not clear as to whether the part indicated by the value "x" is to be used as the background or foreground. As such, if it is difficult to express a figure pattern via a two-dimensional matrix, a part that is not to be used for a pattern matching is defined as "don't care".

Each element of the two-dimensional matrices 401 and 501 may be correlated to one pixel of image data, or to a few pixels thereof.

Figure 6:
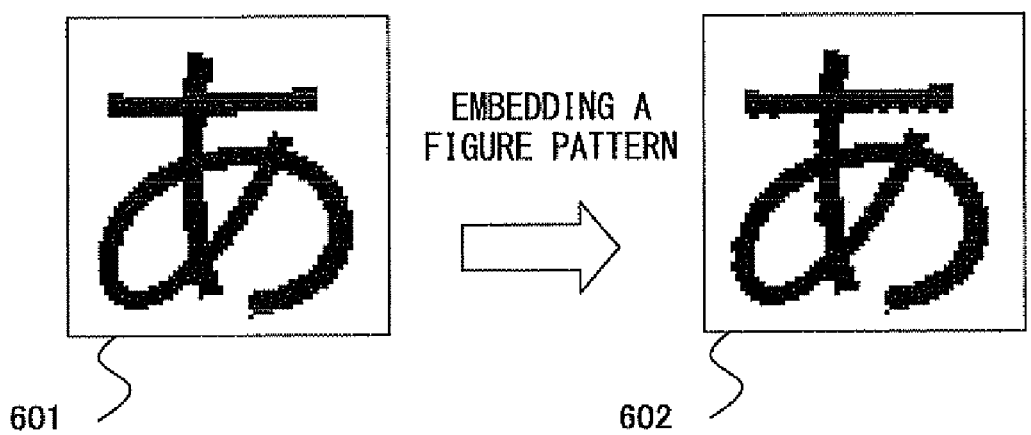
FIG. 6 is a diagram showing a first figure pattern embedment process.

FIG. 6 exemplifies image data embedded with such a figure pattern. An embedment of the figure patterns 301 and 302 in the contours of the character of the image data 601 expressing a Hiragana character (i.e., a phonetic character) in Japanese results in obtaining the image data 602.

Next is a description of the configuration and operation of an electronic watermark embedment apparatus using a figure pattern by referring to FIGS. 7 through 18.

FIG. 7 exemplifies a configuration of an electronic watermark embedment apparatus. The electronic watermark embedment apparatus 701 comprises a figure pattern input unit 702, an image data input unit 703, an embedment information input unit 704, a figure pattern area detection unit 705, an information embedment process unit 706, and an image data output unit 707.

A figure pattern 711 is input into the figure pattern input unit 702, image data 712 is input into the image data input unit 703, and embedding information 713 is input into the embedment information input unit 704.

The following description is based on the premise that the white pixel area of the image data 712 is a background part, and that the black pixel area thereof is a foreground area; however, this selection of background and foreground is just arbitrary in terms of the present invention. As an example, it could be determined that the high brightness value of a color image is to be a background part and that a low brightness value is to be a foreground part; as such, the present invention is also applicable to an image other than a black & white image.

The figure pattern input unit 702 stores the information of the input figure pattern 711 in the form of, for example, a two-dimensional matrix, as shown in FIG. 4. In this case, plural kinds of figure patterns to be used simultaneously may be input into the figure pattern input unit 702. As an example, an input of the figure patterns 801 through 804 shown in FIG. 8 makes it possible to embed four kinds of figure patterns in the image data 712.

The embedment information input unit 704 outputs the embedding information 713 as watermark information 714 to the information embedment process unit 706. The watermark information 714 is a bit string represented by the logic "0" or "1". Meanwhile, the embedding information 713 may be text or numbers.

As an example, if the embedding information 713 is English text, the embedment information input unit 704 converts a character within the embedding information 713 into an ASCII (a registered trademark) code corresponding to the character and outputs the result as watermark information 714.

Alternatively, the watermark information 714 may be generated by adding a code bit using an error correction code for improving the detection accuracy. For example, using 63-bit information that is a result of adding a hamming code of 6 bits to information of 57 bits, a bit error of one bit can be corrected for the watermark information 714.

The image data input unit 703 outputs the image data 712 to the figure pattern area detection unit 705 and information embedment process unit 706, while the figure pattern input unit 702 outputs the information of the figure pattern 711 to the figure pattern area detection unit 705.

The figure pattern area detection unit 705 detects an area allowing an embedment of the figure pattern 711 from the image data 712. The information embedment process unit 706 generates image data by embedding the figure pattern 711, which indicates the watermark information 714, in the image data 712.

The information embedment process unit 706 outputs the generated image data to the image data output unit 707, which then outputs watermark embedded image data 715 embedded with the watermark information 714. The watermark embedded image data 715 may be printed by a printer, et cetera, or stored as electronic data.

Figure 9:
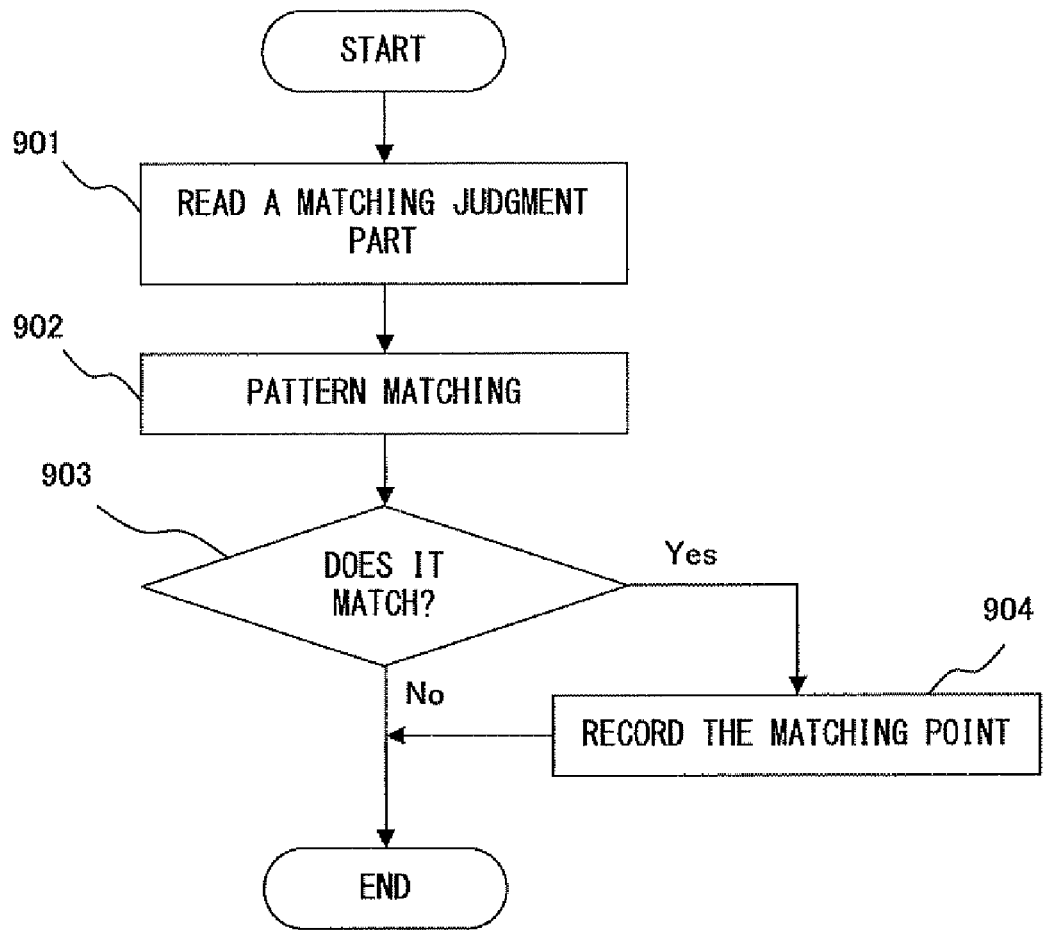
FIG. 9 is a flow chart of a figure pattern area detection process.

FIG. 9 is a flow chart of a figure pattern area detection process performed by the figure pattern area detection unit 705. The figure pattern area detection unit 705 first reads a matching judgment part from the image data 712 (step 901). The size of a matching judgment part to be read varies with the kind of figure pattern which is to be embedded.

Then, the figure pattern area detection unit 705 performs a pattern matching process (step 902) and judges whether or not the matching judgment part is identical to the basic pattern constituting the figure pattern 711 (step 903).

The pattern matching process checks whether or not the basic pattern matches the foreground of the image data 712 and whether or not the part that is not part of the basic pattern matches the background of the image data. In this event, a pattern matching process is not carried out for the part of the directional pattern and the part that is not to be used for a pattern matching, as shown by the "a" and "x" of the two-dimensional matrix 401 for example.

As an example, where each element of the two-dimensional matrix 401 of the figure pattern 203 is one dot, first, an area with a size of 8×3 (8 horizontal dots by 3 vertical dots) is extracted from the image data 712. Then, the extracted area is superimposed on the two-dimensional matrix 401 and whether or not the following two conditions are satisfied is checked:

(1) The entire part of the two-dimensional matrix 401 defined as "1" is overlapped with the foreground of the image data 712; and (2) The entire part of the two-dimensional matrix 401 defined as "0" is overlapped with the background of the image data 712.

Figure 10:
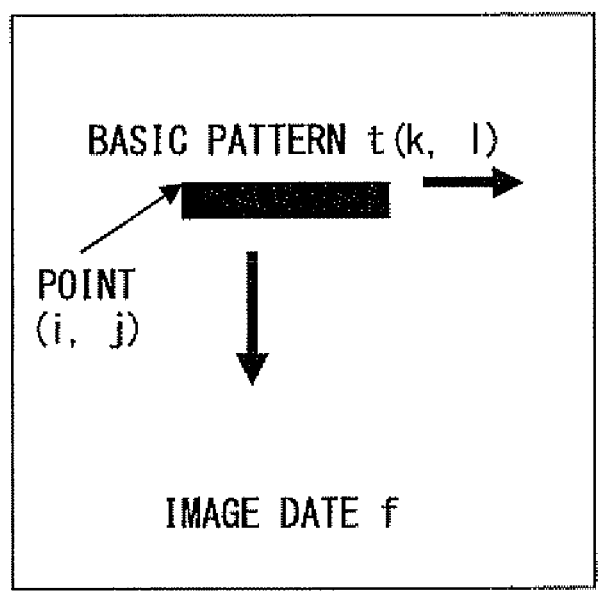
FIG. 10 is a diagram showing a pattern matching.

Here, let it be assumed that a point (i, j) on the image data f has a pixel value of f(i, j) as shown in FIG. 10, where the pixel value of a black pixel is "1" and the pixel value of a white pixel is "0". Further, let it be assumed that when a matrix element corresponding to a point (k, 1) of the basic pattern t of the size a×b is t(k, 1), a pattern matching is carried out. In the case of the two-dimensional matrix 401, a=8 and b=1. In this event, if the value of the following expression is "0", then the condition of paragraph (1) above is satisfied for the point (i, j):

$$\sum_{l=0}^{b-1}\sum_{k=0}^{a-1}|f(i+k, j+l) - t(k, l)| \tag{1}$$

Further, the use of the part of the two-dimensional matrix 401 defined as "0" in place of the basic pattern t makes it possible to check the condition of paragraph (2).

If the conditions of both paragraphs (1) and (2) above are satisfied, then the matching judgment part is regarded as matching with the basic pattern, and the coordinates of the point (i,j) are stored in the memory (step 904). The performance of such a process for the entirety of the image data 712 results in extracting a plurality of figure pattern areas, allowing an embedment of the figure pattern 711.

Then, the information embedment process unit 706 embeds the watermark information 714 by using the figure pattern 711 itself, or embeds the watermark information 714 in the neighboring area of the figure pattern 711.

Figure 11:
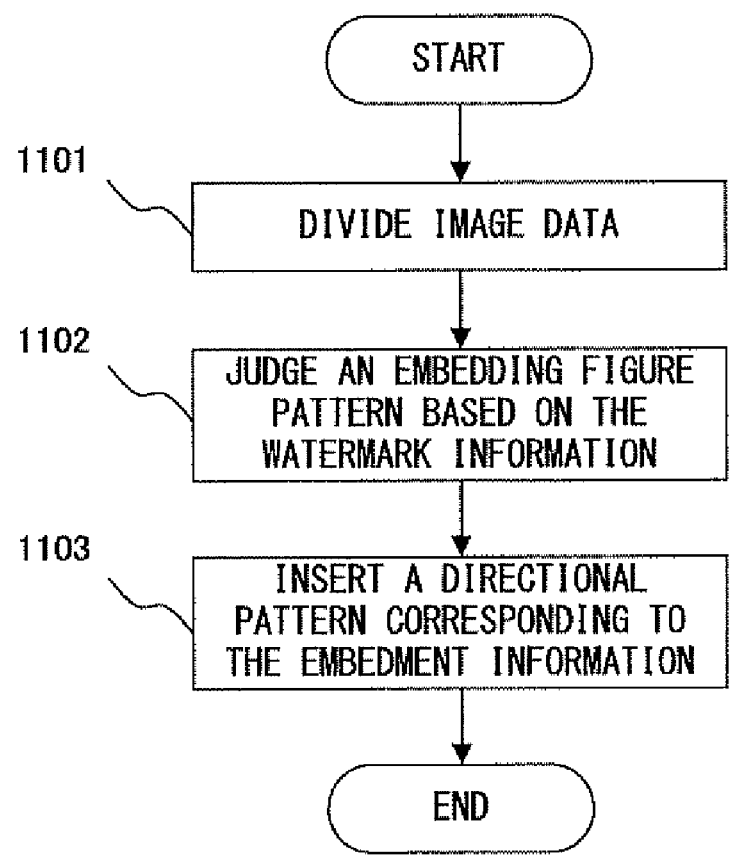
FIG. 11 is a flow chart of a first information embedment process.

FIG. 11 is a flow chart of an information embedment process by using a figure pattern itself. First, the information embedment process unit 706 divides the entirety, or a part, of the image data 712 into a plurality of embedment areas (step 1101). Each embedment area is a rectangular area of m×n (i.e., m horizontal dots by n vertical dots, where m and n are natural numbers) for instance. Note that the size of the embedment area needs to be larger than the figure pattern 711.

Then, it judges that a figure pattern 711 corresponding to the watermark information 714 is embedded in each embedment area (step 1102). If a plurality of figure pattern areas exist within one embedment area, one or more figure patterns 711 can be embedded within the range of the number of the figure pattern areas. Also, one kind of figure pattern 711 may be used singularly, or alternatively, a combination of plural kinds of figure patterns may be used, corresponding to the watermark information 714.

As an example, the combinations of four kinds of figure patterns 801 through 804 are used in accordance with the watermark information 714 as follows:

(a) If the bit of a specific position, such as the head bit, is "1", then the figure patterns 801 and 804 are embedded.

(b) If the bit of the specific position is "0", then the figure patterns 802 and 803 are embedded.

(c) If the bit of a position other than the specific position is "1", then the figure patterns 801 and 803 are embedded.

(d) If the bit of the position other than the specific position is "0", then the figure patterns 802 and 804 are embedded.

In this case, on the basis of a combination of two kinds of figure patterns embedded in each embedment area, a one-bit judgment of the watermark information 714 and a positional judgment thereof can be carried out simultaneously. An exception is that only one kind of figure pattern is embedded in an embedment area where an area allowing an embedment of two kinds of figure patterns does not exist.

Figure 12:
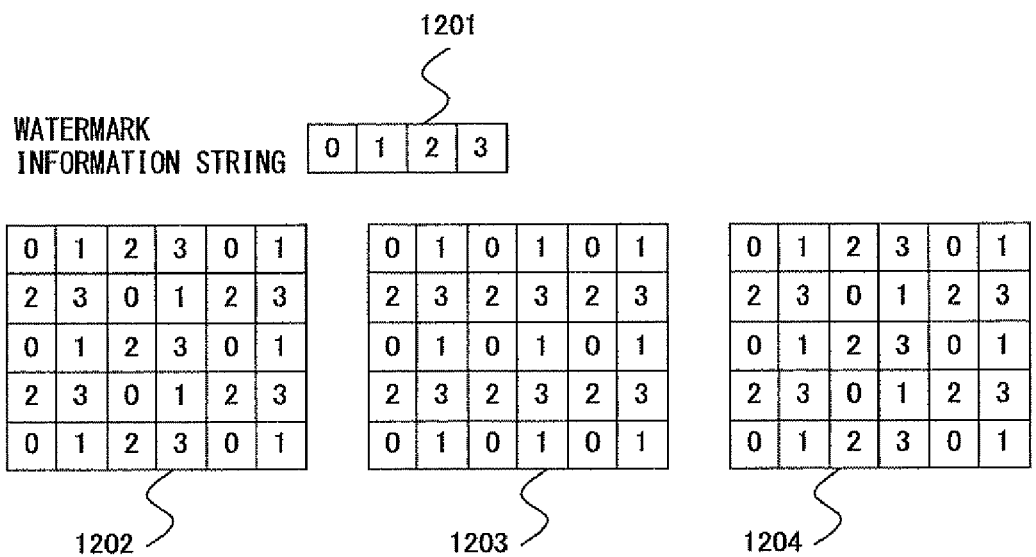
FIG. 12 is a diagram showing three kinds of embedment methods.

An information string of the watermark information 714 in units of information of one bit or several bits is embedded continuously in a plurality of embedment areas corresponding to the information string, as shown in FIG. 12. FIG. 12 shows three methods as examples of embedding a watermark information string 1201 represented by the numbers 0 through 3 starting from the head.

The watermark information string 1201 is continuously embedded in the row direction in the area 1202, and the watermark information string 1201 is embedded as a two-dimensional matrix of the size 2×2 in the area 1203, and the two-dimensional matrix is embedded by being shifted in the area 1204. It is desirable to set as a parameter the embedding method being used in advance of an embedment.

Then, the information embedment process unit 706 inserts a directional pattern corresponding to the watermark information 714 into a figure pattern area detected by the figure pattern area detection unit 705 in each of the embedment areas (step 1103). This process results in embedding one or plural kinds of figure patterns in each embedment area.

Figure 13:
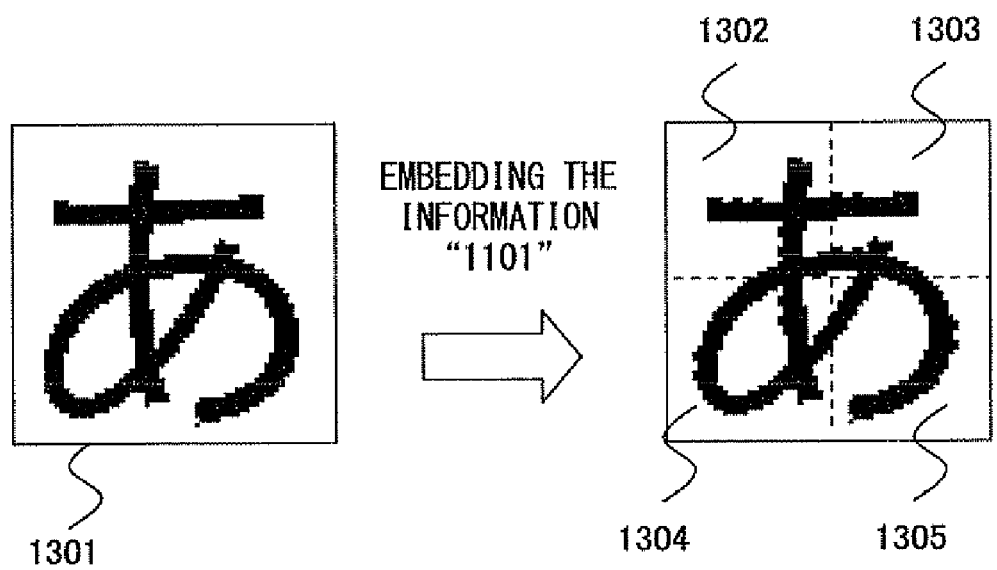
FIG. 13 is a diagram showing a second figure pattern embedment process.

FIG. 13 exemplifies the watermark embedded image data 715 in the case of divisionally embedding an information string "1101" into four embedment areas of image data 1301. Two kinds of figure patterns 801 and 804 corresponding to the head bit "1" are embedded in the embedment area 1302, and one kind of figure pattern 801 corresponding to the bit "1" is embedded in the embedment area 1303. Furthermore, one kind of figure pattern 804 corresponding to the bit "0" is embedded in the embedment area 1304, and one kind of figure pattern 803 corresponding to the bit "1" is embedded in the embedment area 1305.

Figure 14:
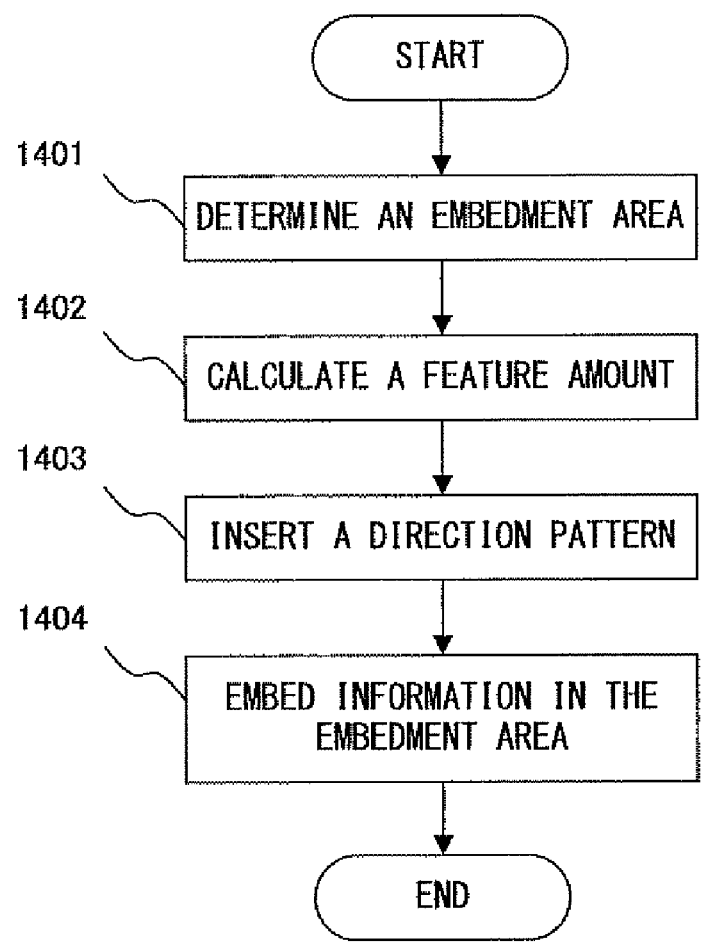
FIG. 14 is a flow chart of a second information embedment process.

FIG. 14 is a flow chart of an information embedment process in the neighboring area of a figure pattern that is different from the information embedment process shown in FIG. 11. In this case, shadowing an edge part of the foreground included in the image data 712 embeds information and a figure pattern 711 as a marker indicating the embedded position.

The information embedment process unit 706 first determines an embedment area to be embedded with information (step 1401). Here, it determines an embedment area on the basis of the direction pattern of a figure pattern 711 that allows an embedment in the figure pattern area detected by the figure pattern area detection unit 705. Provided that the form of the directional pattern and the direction in which the embedment area exists are correlated with each other in advance of the process, the embedment area may exist in the same direction as the direction pattern in relation to the basic pattern, or in a different direction from the directional pattern.

The shape of the embedment area is arbitrary, provided that it is close to the figure pattern; the embedment area must be larger than the area required for the information to be embedded, however. As an example, the embedment area is set as a rectangular area of the size m×n and is adjacent to any of the directions of up, down, left or right to the figure pattern 711. In this case, m×n is equal to or larger than S, provided that the watermark information 714 is S bits, where S is a natural number.

Then, the information embedment process unit 706 calculates the feature amount of the embedment area (step 1402). The feature amount of the embedment area is calculated as the number of pixels in proximity to the edge part of a contour, in which adjacent pixel values within the image data 712 are different. Therefore, the feature amount can be calculated from the difference between the image data 712 and image data that is a result of shifting the image data 712 by the distance of several pixels.

As an example, definitions are such that the pixel value of a black pixel is "1", that of a white pixel is "0", the horizontal direction of the image data 712 is the x axis, the vertical direction thereof is the y axis, and the pixel value of the horizontal x-th dot and vertical y-th dot is f (x,y), where x and y are integers that are "0" or larger. Further, the f(x,y) is compared with the pixel value f(x+i,y+j), where i and j are integers, of a pixel separated by i dots to the right (i.e., the positive direction of the x axis) and separated by j dots in the down direction (i.e., the positive direction of the y axis), and the number of pixels of the parts satisfying the following expression (2a) or (2b) are determined to be the feature amount:

$$f(x,y)=0 \text{ and } f(x+i,y+j)=1 \quad (2a)$$

$$f(x,y)=1 \text{ and } f(x+i,y+j)=0 \quad (2b)$$

Then, to shadow the edge part, the number of pixels in the foreground is increased or decreased. In the case of increasing the number of pixels, f(x,y)=1 is set for the x and y satisfying the expression (2a), while in the case of decreasing the number of pixels, f(x,y)=0 is set for the x and y satisfying the expression (2b). A change of the pixel values of the increased or decreased pixels as described above results in embedding the information in an edge part.

Figure 15:
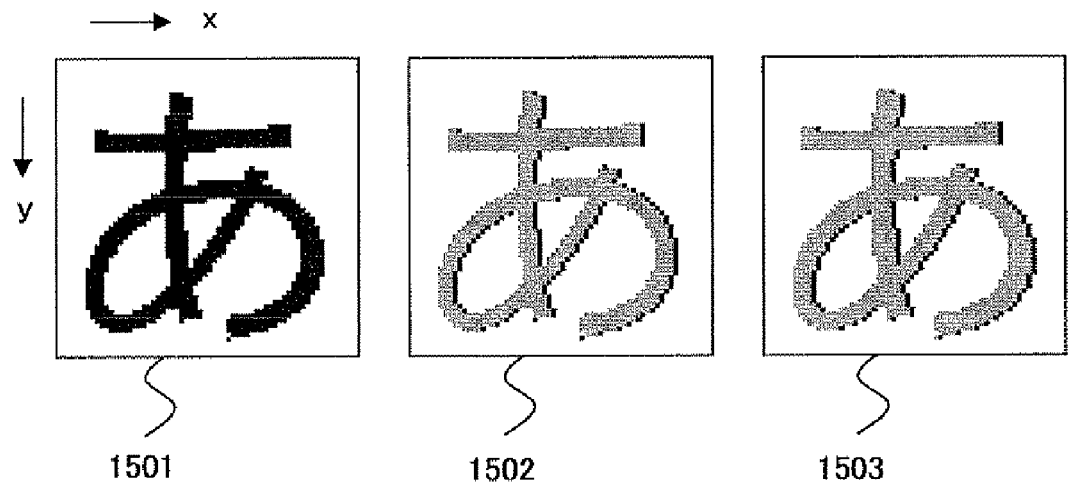
FIG. 15 is a diagram showing an information embedment position.

FIG. 15 shows the pixels increasing or decreasing in the case of setting i=−1 and j=0. A decrease in the number of pixels of the foreground of image data 1501 decreases the part corresponding to the black pixels of image data 1502, and an increase in the number of pixels of the foreground increases the part corresponding to the black pixels of image data 1503.

Figure 16:
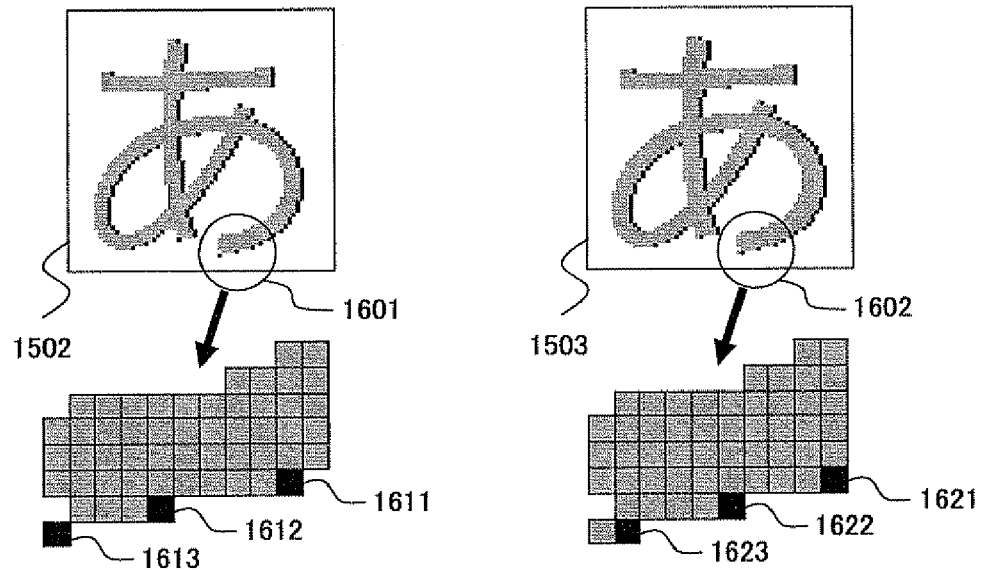
FIG. 16 is an enlargement diagram of an information embedment position.

An enlargement of a part of the image data 1502 and 1503 appears as shown in FIG. 16. In the foreground part 1601 of the image data 1502, pixels 1611 through 1613 constitute the information embedment positions, and in the foreground part 1602 of the image data 1503, pixels 1621 through 1623 constitute the information embedment positions.

Then the information embedment process unit 706 inserts the directional pattern of the corresponding figure pattern 711 into the embedment area determined in step 1401 (step 1403). Here, if plural embedment areas corresponding to the different figure patterns 711 are overlapped, the directional pattern is inserted preferentially into the embedment area of the largest feature amount.

Then, the pixel number of the increased or decreased pixels is changed, thereby embedding the information in the embedment area into which the direction pattern has been inserted (step 1404). In this event, the same watermark information 714 may be embedded in all embedment areas, or the watermark information 714 may be embedded by dividing it in accordance with the kind of figure pattern 711.

As an example, if there are four kinds of figure patterns to be used for embedding, the information that is a result of dividing the watermark information 714 into four parts can be embedded in the individual embedment areas corresponding to the respective figure patterns 711.

Here, the information is embedded so that increased or decreased pixels are visible in the shadow of the foreground. The shadow is expressed by a pixel value that is between white and black. The lining up of a watermark information string in the horizontal direction, vertical direction or both directions in each of the embedment areas makes it possible to embed the information.

Figure 17:
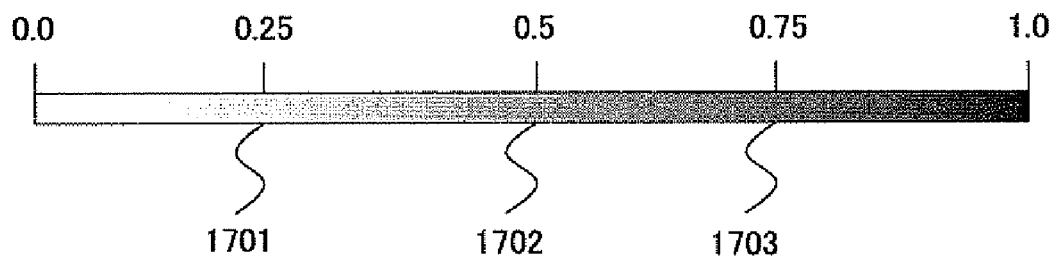
FIG. 17 is a diagram showing pixel values of shadows.

As an example, the pixel values 1701 through 1703 of FIG. 17 are used as shadow pixel values, information indicating the start of the watermark information string is correlated with the pixel value 1702 (0.5), and the bits "1" and "0" are correlated to the pixel values 1701 (0.25) and 1703 (0.75), respectively.

FIG. 18 shows a result of embedding a watermark information string "1101" in image data 1801 in the horizontal direction of an embedment area. In the area 1803 of the obtained image data 1802, an embedment area is secured on the right side of a figure pattern 804, and shadow pixels 1811 through 1815 are generated.

This example creates shadows by decreasing the number of pixels in the foreground; it is, however, desirable to increase or decrease the number of pixels in the foreground randomly for a plurality of embedment areas in order to not vary greatly the number of pixels of the foreground or background in the entirety of the image data 712.

Meanwhile, when outputting the watermark embedded image data 715 embedded with information, the shadow pixels may be allowed to be binarized by a dithering at the image data output unit 707; the density of the shadow needs to be changed, however, so that the pattern of pixels after the dithering does not match with the cycle of the directional pattern.

Next is a description of the configuration and operation of the electronic watermark detection apparatus detecting embedded information from watermark embedded image data by referring to FIGS. 19 through 27.

Figure 19:
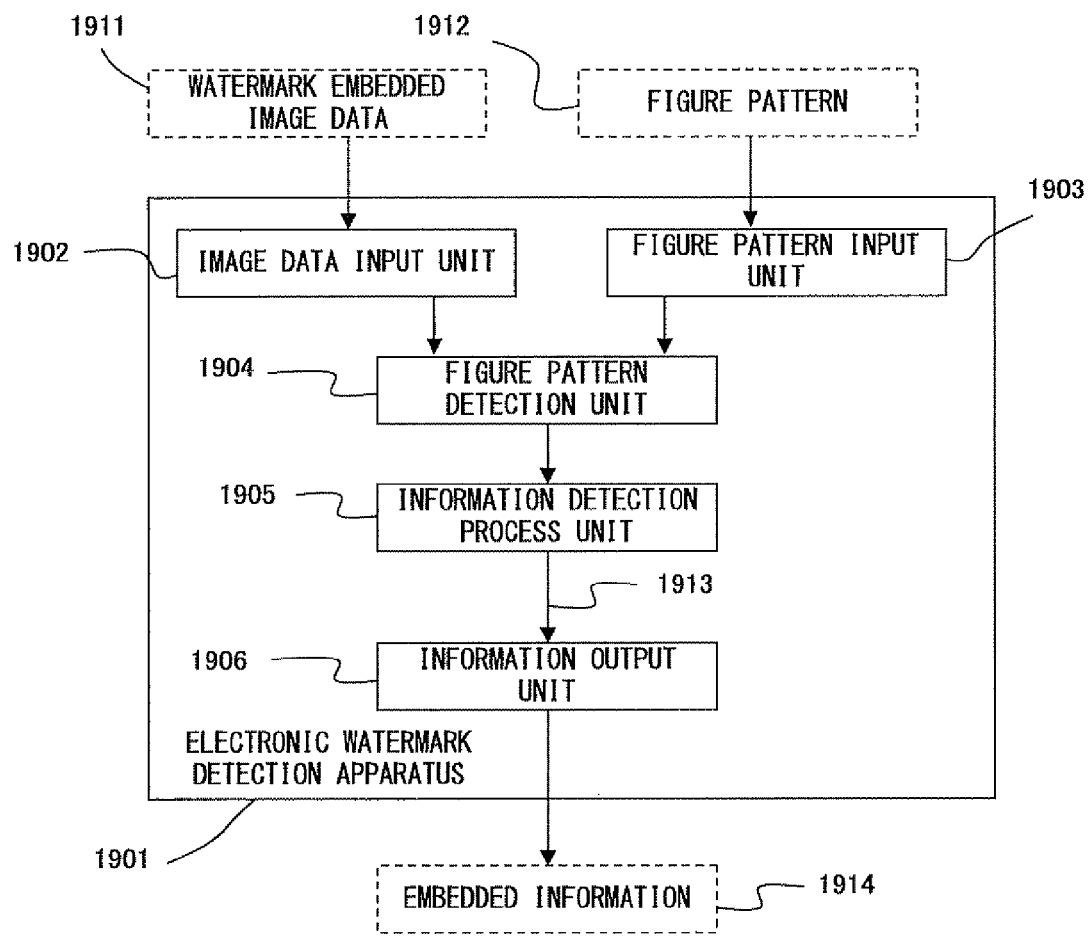
FIG. 19 is a configuration diagram of an electronic watermark detection apparatus.

FIG. 19 exemplifies a configuration of an electronic watermark detection apparatus. The electronic watermark detection apparatus 1901 comprises an image data input unit 1902, a figure pattern input unit 1903, a figure pattern detection unit 1904, an information detection process unit 1905, and an information output unit 1906.

Assumed here is a detection of information from watermark embedded image data 1911 that is a result of reading watermark embedded printed matter by employing a scanner apparatus; however, other methods may be applied, such as inputting watermark embedded image data 715 (shown in FIG. 7) that has been stored as electronic data as the watermark embedded image data 1911.

First, the watermark embedded image data 1911 is input into the image data input unit 1902, and at the same time a figure pattern 1912 is input into the figure pattern input unit 1903. The same figure pattern as the figure pattern 711 input into the electronic watermark embedment apparatus 701 is input as the figure pattern 1912. The input watermark embedded image data 1911 and figure pattern 1912 are sent to the figure pattern detection unit 1904.

Then, the figure pattern detection unit 1904 detects, from the watermark embedded image data 1911, a spot in which a figure pattern 1912 is embedded, and the information detection process unit 1905 detects embedded watermark information 1913 from the detection result of the figure pattern detection unit 1904.

Then, the information output unit 1906 converts, and outputs, the watermark information 1913 into embedded information 1914. If an error correction code is included in the watermark information 1913, the information output unit 1906 performing a correction process for the error bit improves the detection accuracy. As such, the embedded information 1914 output from the information output unit 1906 is stored as information included in the watermark embedded image data 1911.

FIG. 20 is a flow chart of a figure pattern detection process performed at the figure pattern detection unit 1904. The figure pattern detection unit 1904, first, applies a nonlinear filter to the watermark embedded image data 1911, thereby detecting the directional pattern of a desired figure pattern 1912 (step 2001).

A nonlinear filter may use any filter, provided that it is capable of detecting a signal characteristic such as frequency, phase, amplitude or such of the directional pattern. As an example, a one-dimensional Fourier transform represented by the following expression (3) may be used as a nonlinear filter, where the pixel value (0 through 255) of the n-th pattern is x(n) (where n=0, 1 through N−1):

$$X(k) = \frac{1}{\sqrt{N}} \sum_{n=0}^{N-1} x(n) \cdot e^{-j2\pi k/N} \qquad (3)$$

Figure 21:
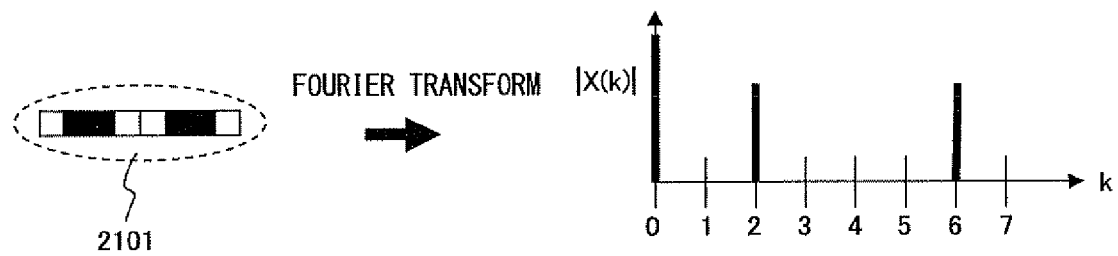
FIG. 21 is a diagram showing a nonlinear filtering process.

FIG. 21 shows a result of applying a one-dimensional Fourier transform of the above expression (3) to the directional pattern 2101. The directional pattern 2101 is constituted by eight pixels lined up in the horizontal direction and therefore N=8. In this example, the amplitude |X(k)| of X(k) for k=0, 1, 2 through 7 is expressed in a graph and the directional pattern 2101 is waves of 2 cycles, and therefore it is shown that the amplitudes in k=2 and k=6 are large after the Fourier transform. In terms of the nature of a Fourier transform, the amplitude is always large at k=0.

As described above, an extraction, from the watermark embedded image data 1911, of an area corresponding to the size of the directional pattern 2101, an application of a Fourier transform to the area, and the discovery of an area in which an amplitude of k>0 corresponding to the cycle of the directional pattern is larger than a predefined threshold make it possible to detect a directional pattern. Note that an application of a nonlinear filter only to the foreground of the watermark embedded image data 1911 makes it possible to speed up the process.

Figure 22:
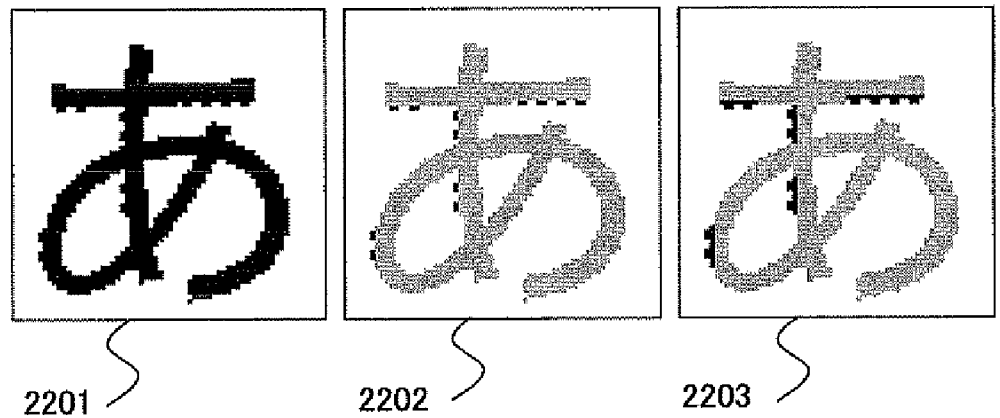
FIG. 22 is a diagram showing a figure pattern detection process.

As an example, an application of a nonlinear filter to the watermark embedded image data 2201 shown in FIG. 22 detects a directional pattern as shown by the image data 2202.

Then a pattern matching using the entirety of the figure pattern is performed for the neighboring area of the detected directional pattern (step 2002).

It is usually not possible to discern whether or not a desired figure pattern 1912 is embedded in the area just by detecting a directional pattern. For example, if the figure patterns 801 and 802 shown in FIG. 8 are embedded in the watermark embedded image data 1911, the mere detection of a directional pattern does not allow discernment as to which figure pattern that is. It is the same in the case of embedding the figure patterns 803 and 804.

Accordingly, an application of a pattern matching process by using the entirety of the figure pattern to the neighboring area of the direction pattern enables the discernment of the embedded figure pattern 1912 as shown by image data 2203 of FIG. 22. The kind of discerned figure pattern 1912 is recorded in the memory (step 2003).

As such, the performing of the detection process by focusing on the directional pattern of the figure pattern 1912 distributedly placed within the watermark embedded image data 1911 makes it possible to detect the figure pattern 1912 even if a part of the image is cut off or if the contour part is fuzzy or blurred due to printing or copying.

As described above, there are two conceivable methods for embedding the watermark information 1913, and these each require a different detection method in accordance with the adopted embedment method. The information detection process unit 1905 detects watermark information 1913 from the figure pattern 1912 itself, or from the neighboring area of the figure pattern 1912.

FIG. 23 is a flow chart of an information detection process from a figure pattern itself. The information detection process unit 1905 first judges a border of an embedment area from the detected figure pattern 1912 (step 2301).

Each embedment area is a rectangular area of the size m×n as described above. As an example, when one bit is judged by the kind of figure pattern 1912 embedded in the embedment area, a rectangular area R of the size Am×Bn (where A and B are random natural numbers) is extracted from the watermark embedded image data 1911. Then, the value of the next expression is calculated while shifting the rectangular area R dot by dot in the range of the horizontal m dots and vertical n dots:

$$\sum_{l=0}^{B-1}\sum_{k=0}^{A-1}|C(k,l)-D(k,l)| \quad (4)$$

When the rectangular area R is divided into A×B pieces of rectangular areas of the size m×n, then C(k,l) expresses the number of figure patterns 1912 corresponding to the bit "1" in the rectangular area r(k,l), which is the k-th area from the left and l-th area from the top. Further, D(k,l) expresses the number of figure patterns 1912 corresponding to the bit "0" in the rectangular area.

If the rectangular area R matches with the border of the embedment area, only the figure pattern 1912 corresponding to either one of the bits "1" or "0" is included in each rectangular area r(k,l), and therefore the value of the expression (4) becomes the largest. In contrast, if the rectangular area R is away from the border of the embedment area, then the figure patterns 1912 corresponding to the bits "1" and "0" are mixed within each rectangular area r(k,l), and therefore the value of the expression (4) become small. Therefore, the position at which the value of the expression (4) becomes largest is judged as the border of the rectangular area.

Figure 24:
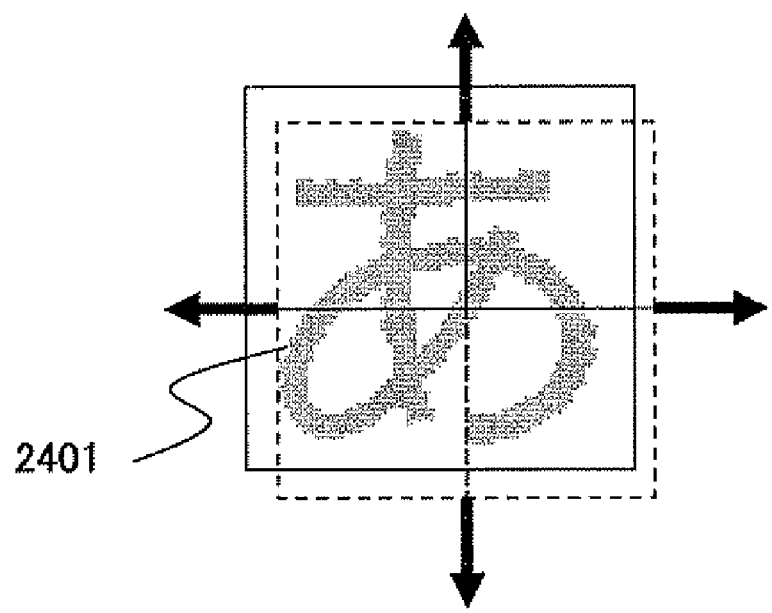
FIG. 24 is a diagram showing a border judgment process.

As an example, in the case of dividing a rectangular area 2401 of FIG. 24, as rectangular area R, into a 2×2 grid of smaller rectangular areas, the value of the expression (4) is calculated while the rectangular area 2401 is being shifted in the up, down, left and right direction, and A=B=2.

Then the information detection process unit 1905 detects the starting position of the watermark information (step 2302). The starting position of the watermark information is discerned from the kind of figure pattern 1912 embedded in each embedment area. For example, if the information is embedded by combining the four kinds of figure patterns 801 through 804 (shown in FIG. 8) as described in paragraphs (a) through (d), the value of the following expression (5) is calculated for each of the embedment areas:

$$|(\text{the number of figure patterns 801}) - \quad (5)$$
$$(\text{the number of figure patterns 802}) -$$
$$(\text{the number of figure patterns 803}) +$$
$$(\text{the number of figure patterns 804})|$$

The value of expression (5) corresponding to a specific position such as the head position of a watermark information string is larger than that of other positions, and therefore the start position of watermark information can be identified by expression (5).

If only one kind of figure pattern 1912 is detected from the embedment area, or if no figure pattern 1912 is detected therefrom, expression (5) may be calculated by totaling the number of figure patterns 1912 in the plurality of embedment areas corresponding to the same watermark information string.

As an example, in the case of the area 1202 shown in FIG. 12, the kinds and number of figure patterns 801 through 804 are calculated from all the embedment areas corresponding to the information "0", "1", "2" and "3" of the watermark information string 1201.

The position of the information included in each embedment area is specified by the combinations of paragraphs (a) through (d) described above, and therefore the sequence numbers of the information included in each embedment area can be determined if the figure pattern of the specific position can be detected.

Then, watermark information 1913 is judged on the basis of the kind of the figure pattern 1912 embedded in each embedment area. In the judgment of the watermark information 1913, the judgment may be made on the basis of the principle of majority rule by calculating the kinds and number of figure patterns 1912 from all the embedment areas embedded with the same information. Alternatively, continuous watermark information of a one-dimensional direction or two-dimensional matrix may be judged.

In the above example, the value of the following expression (6) is calculated for the specific position of a watermark information string, and if the value is larger than "0", the judgment is a "1" bit, while if the value is smaller than "0", the judgment is a "0" bit:

$$(\text{the number of figure patterns 801}) - \quad (6)$$
$$(\text{the number of figure patterns 802}) -$$
$$(\text{the number of figure patterns 803}) +$$
$$(\text{the number of figure patterns 804})$$

Further, the value of the following expression (7) is calculated for a position other than the specific position, and if the value is larger than "0", the judgment is a "1" bit, while if the value is smaller than "0", the judgment is a "0" bit:

$$(\text{the number of figure patterns 801}) - \quad (7)$$
$$(\text{the number of figure patterns 802}) +$$
$$(\text{the number of figure patterns 803}) -$$
$$(\text{the number of figure patterns 804})$$

FIG. 25 is a flow chart of an information detection process from the neighboring area of a figure pattern. In this case, the information detection process unit 1905 first extracts an embedment area on the basis of the directional pattern of the detected figure pattern 1912 (step 2501) and calculates the feature amount of each embedment area extracted (step 2502). The feature amount of an embedment area is, for example, a result of calculating the pixel value of an edge part. Then, embedded information 1914 is judged on the basis of the obtained feature amount (step 2503). For example, the information is calculated from all the embedment areas and the embedded information 1914 is judged on the basis of the principle of majority rule.

From the process of step 1404 of FIG. 14, the information is embedded as a shadow in the neighboring pixel of the figure pattern 1912; however, there is a risk of fuzziness and blurring occurring in the shadow part due to printing or copying.

Figure 26:
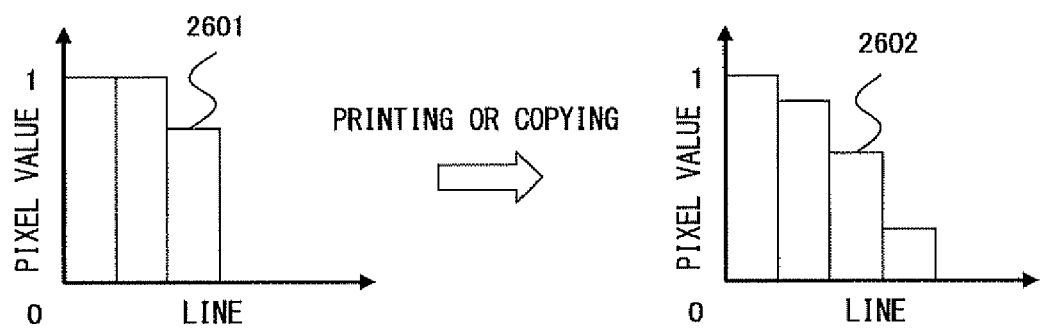
FIG. 26 is a diagram showing a variation of shadow pixel values.

FIG. 26 shows the relationship between the line and pixel value of the edge part where the information is embedded.

The horizontal axis represents the pixel string in the horizontal or vertical direction within the watermark embedded image data 1911, and the vertical axis represents the pixel values of individual pixels. Of these pixel values, the pixel value 2601 embedded as a shadow has the possibility of changing to the pixel value 2602 due to printing or copying.

Accordingly, in step 2503, the difference between the gradient of the pixel values of the foreground part adjacent to a shadow part and the gradient of the pixel values in the background part adjacent to the shadow part is calculated to judge the embedded information. As an example, an application of a horizontal direction Sobel filter 2701 and vertical direction Sobel filter 2702 as shown in FIG. 27 to the neighboring pixels of a target pixel results in obtaining the gradient of the pixel values.

Assuming the coordinates of the target pixel as (i,j) and the pixel value of a point (i,j) as f(i,j), the output Gx of the horizontal direction Sobel filter 2701 and the output Gy of the vertical direction Sobel filter 2702 are respectively represented by the following expressions (8) and (9):

$$Gx = f(i-1, j-1) + 2f(i-1, j) + f(i-1, j+1) - \\ f(i+1, j-1) - 2f(i+1, j) - f(i+1, j+1) \quad (8)$$

$$Gy = f(i-1, j-1) + 2f(i, j-1) + f(i+1, j-1) - \\ f(i-1, j+1) - 2f(i, j+1) - f(i+1, j+1) \quad (9)$$

The magnitude of the gradient is calculated by the following expression (10) using Gx and Gy:

$$G = |Gx| + |Gy| \quad (10)$$

As an example, using the pixel values of the shadow shown in FIG. 17 and considering the gradient in the case of changing a white pixel to a black pixel, the following inequality (11) is constituted:

(magnitude of gradient from white to black) > (11)

(magnitude of gradient from white to pixel value 1703) >

(magnitude of gradient from white to pixel value 1702) >

(magnitude of gradient from white to pixel value 1701)

Therefore, the kind of shadow can be discerned by the magnitude of the gradient, thereby enabling the discernment of the information.

Figure 28:
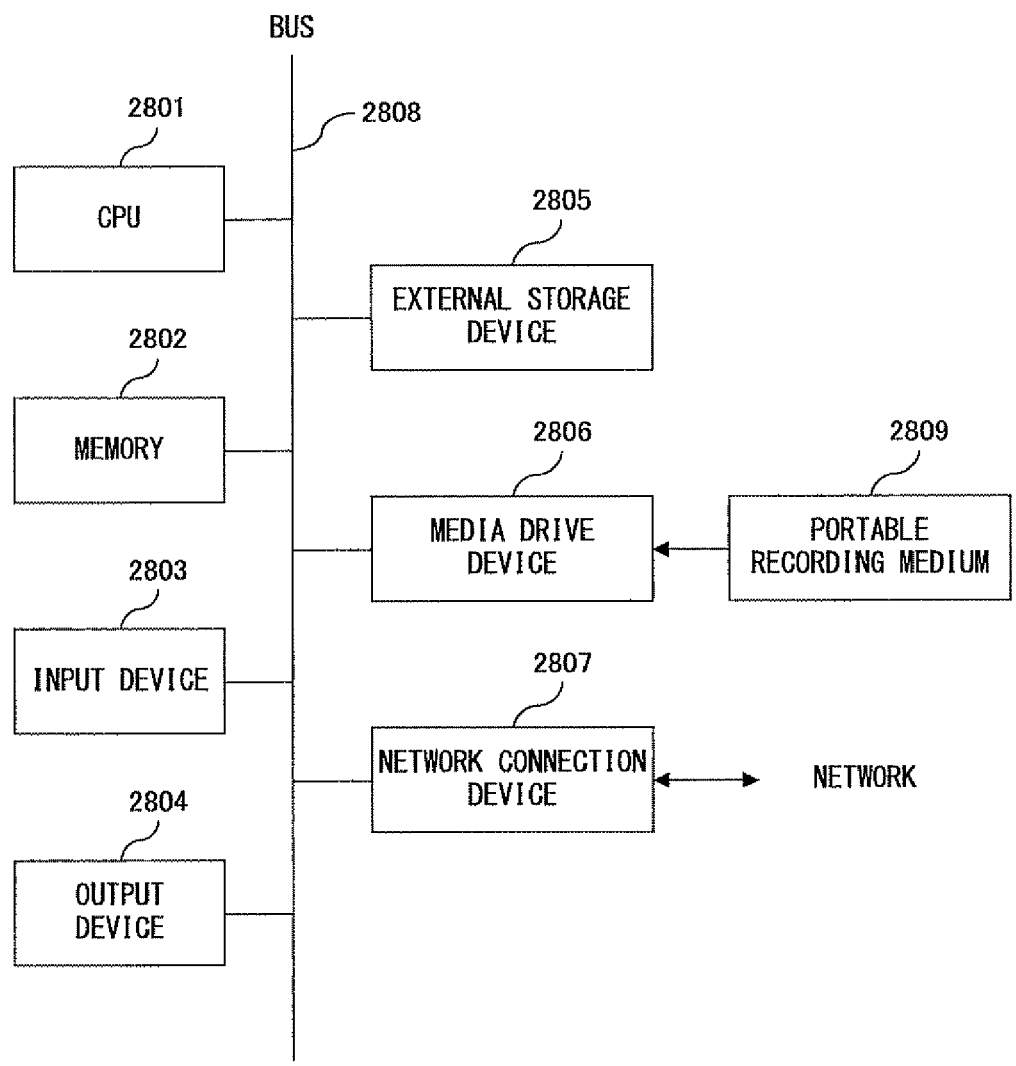
FIG. 28 is a configuration diagram of an information processing apparatus.

Note that the electronic watermark embedment apparatus 701 shown in FIG. 7 and the electronic watermark detection apparatus 1901 shown in FIG. 19 are constituted by employing an information processing apparatus (i.e., a computer) as shown in FIG. 28. The information processing apparatus of FIG. 28 comprises a central processing unit (CPU) 2801, memory 2802, an input device 2803, an output device 2804, an external storage device 2805, a media drive device 2806, and a network connection device 2807, with a bus 2808 interconnecting the aforementioned constituent components.

The memory 2802, including for example read only memory (ROM) and random access memory (RAM), stores a program and the data used for a process. The CPU 2801 executes the program by using the memory 2802, thereby performing the process described above.

In this case, the figure pattern input unit 702, image data input unit 703, embedment information input unit 704, figure pattern area detection unit 705, information embedment process unit 706 and image data output unit 707, which are shown in FIG. 7, correspond to the program stored in the memory 2802; further, the image data input unit 1902, figure pattern input unit 1903, figure pattern detection unit 1904, information detection process unit 1905, and information output unit 1906, which are shown in FIG. 19, also correspond to the program stored in the memory 2802.

The input device 2803, comprehending for example a keyboard, a pointing device and the like, is used for inputting instructions and information from an operator. The output apparatus 2804, comprehending for example a display, a printer, a speaker and the like, is used for outputting an inquiry to the operator and a process result to her/him.

The external storage device 2805 comprehends for example a magnetic disk device, an optical disk device, a magneto-optical disk device, a magnetic tape device and the like. The information processing apparatus pre-stores the program and data in the external storage device 2805, then loads them onto the memory 2802 and uses them on an as required basis.

The media drive device 2806 drives a portable recording medium 2809 and accesses the recording contents. The portable recording medium 2809 is a discretionary computer readable recording medium such as a memory card, a flexible disk, an optical disk, a magneto-optical disk or the like. The operator pre-stores the program and data in the portable recording medium 2809, then loads them onto the memory 2802 and uses them on an as required basis.

The network connection device 2807, being connected to a telecommunication network such as a local area network (LAN), performs a data conversion associated with a telecommunication. The information processing apparatus receives the program and data from an external apparatus by way of the network connection device 2807, and, on an as required basis, loads them onto the memory 2802 and uses them.

Figure 29:
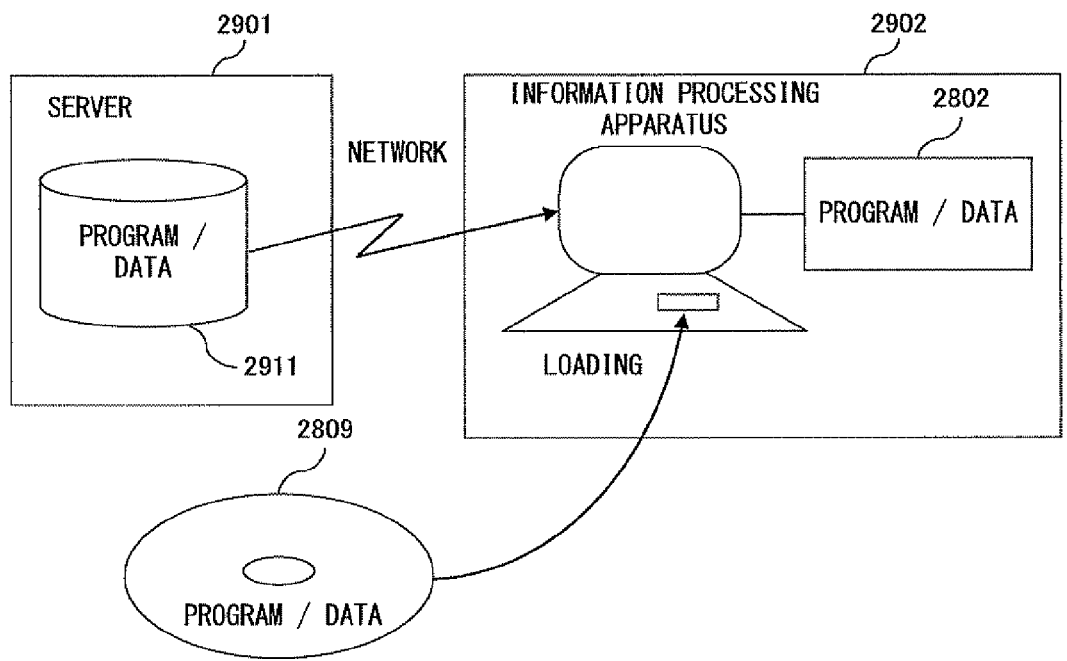
FIG. 29 is a diagram showing a method for providing a program and data.

FIG. 29 shows a method for providing the information processing apparatus of FIG. 28 with the program and data. The program and data stored in the portable recording medium 2809 or the database 2911 of a server 2901 are loaded onto the memory 2802 of the information processing apparatus 2902. The server 2901 generates a propagation signal propagating the program and data and transmits them to the information processing apparatus 2902 by way of an arbitrary transmission medium on the telecommunication network. The CPU 2801 executes the program by using the data, thereby performing the process described above.

What is claimed is:

1. An electronic watermark embedment apparatus embedding information in image data, the electronic watermark embedment apparatus comprising
a computer including:
a detection device configured to detect a figure pattern area allowing an embedment of a figure pattern including a basic pattern and a directional pattern indicating a predetermined direction in relation to the basic pattern, the figure pattern expressing information to be embedded or a position of an area in which the information to be embedded exists, from an area other than a background within the image data; and
an embedment device configured to generate image data embedded with a watermark by embedding the figure pattern on a character in the detected figure pattern area.

2. The electronic watermark embedment apparatus according to claim 1, wherein
the figure pattern possesses a signal characteristic of frequency, phase or amplitude allowing a detection by a filter.

3. A non-transitory computer readable recording medium recording a program for use in a computer that embeds information in image data, the program enabling the computer to perform:
detecting a figure pattern area allowing an embedment of a figure pattern including a basic pattern and a directional pattern indicating a predetermined direction in relation to the basic pattern, the figure pattern expressing information to be embedded or a position of an area in which the information to be embedded exists, from an area other than a background within the image data; and
generating image data embedded with a watermark by embedding the figure pattern on a character in the detected figure pattern area.

4. The recording medium according to claim 3, wherein
the figure pattern possesses a signal characteristic of frequency, phase or amplitude allowing a detection by a filter.

5. The recording medium according to claim 3, wherein
the detecting detects the figure pattern area by pattern matching of a basic pattern constituting the figure pattern and the area other than the background.

6. The recording medium according to claim 3, wherein the program enables the computer to perform:
dividing the image data into a plurality of embedding areas; and
embedding one of plural kinds of figure patterns in accordance with the information to be embedded in a figure pattern area included in each of the plurality of embedding areas.

7. The recording medium according to claim 3, wherein
the program enables the computer to embed the information to be embedded in a neighboring area of the embedded figure pattern.

8. The recording medium according to claim 7, wherein
the computer embeds the information to be embedded by generating a plurality of pixels, the plurality of pixels possessing a plurality of different pixel values and expressing the information to be embedded.

9. A non-transitory computer readable storage medium recording a program for use in a computer that detects information embedded in image data embedded with a watermark, the program enabling the computer to perform:
detecting a figure pattern embedded on a character from an area other than a background within the image data embedded with the watermark, the figure pattern including a basic pattern and a directional pattern indicating a predetermined direction in relation to the basic pattern, and
detecting embedded information expressed by the detected figure pattern or embedded information that exists in an area at a position expressed by the detected figure pattern.

10. The storage medium according to claim 9, wherein
the detecting the figure pattern detects a signal characteristic of frequency, phase or amplitude possessed by the figure pattern by a filter, thereby detecting the figure pattern.

11. The storage medium according to claim 9, wherein
the detecting the figure pattern detects a directional pattern indicating a predetermined direction in relation to a basic pattern included in the figure pattern, and performs pattern matching of the figure pattern including the basic pattern and directional pattern and a neighboring area of the detected directional pattern, thereby detecting the figure pattern.

12. The storage medium according to claim 9, wherein
the detecting the embedded information judges a border of a plurality of embedment areas within the image data embedded with the watermark and detects the embedded information expressed by the figure pattern, on the basis of a kind of a figure pattern belonging to each embedment area among a plurality of detected figure patterns.

13. The storage medium according to claim 9, wherein
the detecting the embedded information extracts pixel values from a plurality of pixels within the area at a position expressed by the detected figure pattern and detects the embedded information by using the extracted pixel values.

* * * * *